United States Patent [19]

DeLancey

[11] Patent Number: 5,054,737

[45] Date of Patent: Oct. 8, 1991

[54] UNIVERSAL SUPPORT APPARATUS FOR A FISHING ROD

[76] Inventor: Daniel D. DeLancey, 12915 Lillian St., Omaha, Nebr. 68138

[21] Appl. No.: 481,230

[22] Filed: Feb. 20, 1990

[51] Int. Cl.[5] ............................................. A01K 97/10
[52] U.S. Cl. .................................... 248/515; 248/278; 43/21.2
[58] Field of Search ............... 248/515, 514, 516, 276, 248/278, 279, 291, 284; 211/70.8; 43/21.2

[56] References Cited

U.S. PATENT DOCUMENTS

| | | | |
|---|---|---|---|
| 620,616 | 3/1899 | Shoemaker | 248/515 |
| 648,444 | 5/1900 | Sorensen | 248/515 |
| 710,726 | 10/1902 | Valiant | 248/276 |
| 719,574 | 2/1903 | Fergusson | 248/276 X |
| 2,466,722 | 4/1949 | May | 248/276 |
| 2,637,516 | 5/1953 | Kessler | 248/515 X |
| 2,712,039 | 6/1955 | Holmes | 248/276 X |
| 2,840,330 | 6/1958 | Minton | 248/515 |
| 3,516,190 | 6/1970 | Cook | 43/21.2 X |
| 3,570,793 | 3/1971 | Shackel | 249/515 |
| 3,708,141 | 1/1973 | Friedgen et al. | 248/515 |

FOREIGN PATENT DOCUMENTS

| | | | |
|---|---|---|---|
| 8794 | 9/1897 | Sweden | 248/278 |
| 2011 | of 1904 | United Kingdom | 248/515 |

*Primary Examiner*—Alvin C. Chin-Shue
*Attorney, Agent, or Firm*—John A. Beehner

[57] ABSTRACT

A universal support apparatus for a fishing rod includes a base adapted for mounting on a vertical or horizontal surface, a fishing rod receptacle, and an articulated support member having opposing ends connected to the base and receptacle for movement of the receptacle about three perpendicular axes.

3 Claims, 8 Drawing Sheets

UNIVERSAL SUPPORT APPARATUS FOR A FISHING ROD

BACKGROUND OF THE INVENTION

The present invention is directed to an improved fishing rod holder and more particularly to an adjustable fishing rod holder capable of supporting a pole in any position relative to a fishing platform.

Several jurisdictions allow fisherman to maintain two or more fishing lines in the water at the same time. Additionally, many fisherman who choose to use a single fishing rod do not care to hold a rod in their hands while fishing, preferring to have their hands free in order to operate a fish locator or the like.

Whereas, fishing rod holders are well known and in common use, the known prior art holders are cumbersome and difficult to use. This difficulty is manifest primarily in the fact that the prior art devices are either not adjustable or have limited adjustability, and lack a method for quickly releasing a fishing rod once a fish strikes the bait or lure.

Fisherman will oftentimes mount fishing rod holders on a horizontal surface of their boats. After casting their lines into the water they then place their fishing rods into these holders. When the tip of the fishing rod is observed oscillating they must quickly grasp the fishing rod, remove it from its holder, and then attempt to set the hook. In this awkward process many fish, which might otherwise have been caught, simply take the bait and swim away. Another disadvantage is that the prior art devices must be removed from the boat to avoid damaging any cover placed on the boat at the end of a fishing excursion. Additionally, when these devices are not in use they create an unnecessary obstacle for boaters.

Accordingly, a principal object of the present invention is to provide an improved fishing rod holder.

Another object of the invention is to provide a fishing rod holder operable to take slack out of a fishing line.

Another object of the invention is to provide a fishing rod holder that is adjustable on three perpendicular axes.

Still another object of the invention is to provide a fishing rod holder that is easy to adjust on any one of the three perpendicular axes.

Still another object of the invention is to provide a fishing rod holder that is both rugged and simple to use.

Still another object of the invention is to provide a fishing rod holder adapted to be mounted on either vertical, horizontal, or inclined surfaces.

Yet another object of the invention is to provide a fishing rod holder that enables a fisherman to conveniently fish from either side of a boat without changing positions.

Yet another object of the invention is to provide devices for preventing multiple rod, line, lure combinations from becoming entangled while trolling.

Another object of the invention is to provide a fishing rod holder that is easily removable for both security and for unobstructed placement of a boat cover on a boat.

Another object of the invention is to provide a fishing rod holder that takes less time to set a hook.

Still another object of the invention is to provide a fishing rod holder that can easily be transferred to various locations on a boat.

Yet another object of the invention is to provide a fishing rod holder that will not damage fishing or boating equipment.

Yet another object of the invention is to provide a fishing rod holder that may be folded over and out of the way of boaters.

SUMMARY OF THE INVENTION

The universal support apparatus for a fishing rod includes a base adapted for mounting on a surface, a fishing rod receptacle, and an articulated support member having opposing ends connected to the base and receptacle for movement of the receptacle about three perpendicular axes.

Also included is a coacting ratchet and pawl mechanism connected between the receptacle and support member to block pivotal movement of the receptacle in at least one direction. The coacting ratchet and pawl mechanism may be adjustable for blocking pivotal movement of the receptacle in either of opposite directions.

To rotate the receptacle in a plane parallel with the horizon, the base may include a post onto which a cup shaped lower end of the support member is placed. A plurality of registrable holes may be provided around the circumference of both the post and cup so that a pin may be used to secure the support member, to the base, at any position.

A step lap joint may be included to provide for movement about a transverse axis.

DESCRIPTION OF THE PREFERRED EMBODIMENT

Figure 1:
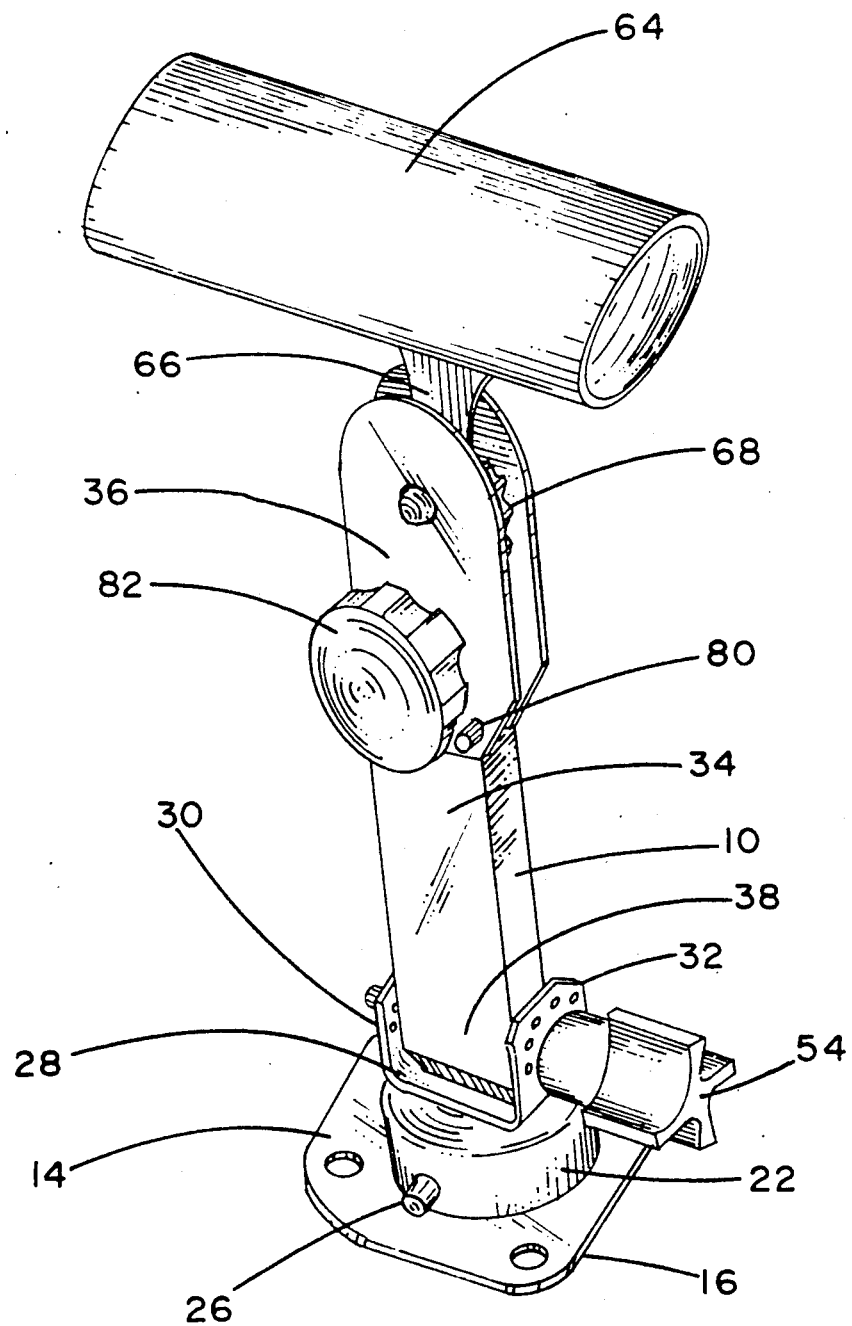
FIG. 1 is a perspective view of a preferred embodiment of the universal support apparatus for a fishing rod.
Figure 2:
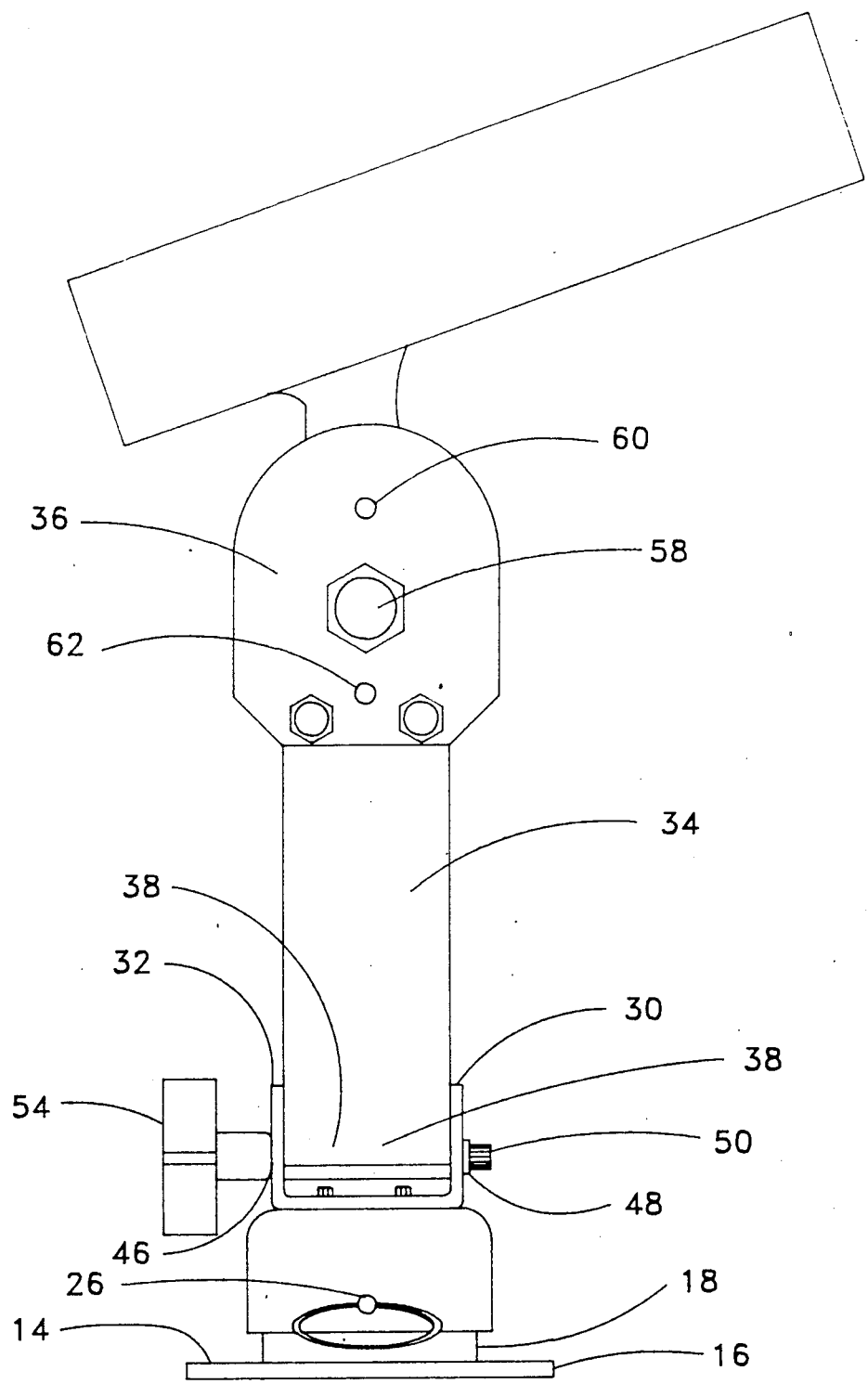
FIG. 2 is a side elevational view of the embodiment of FIG. 1.
Figure 3:
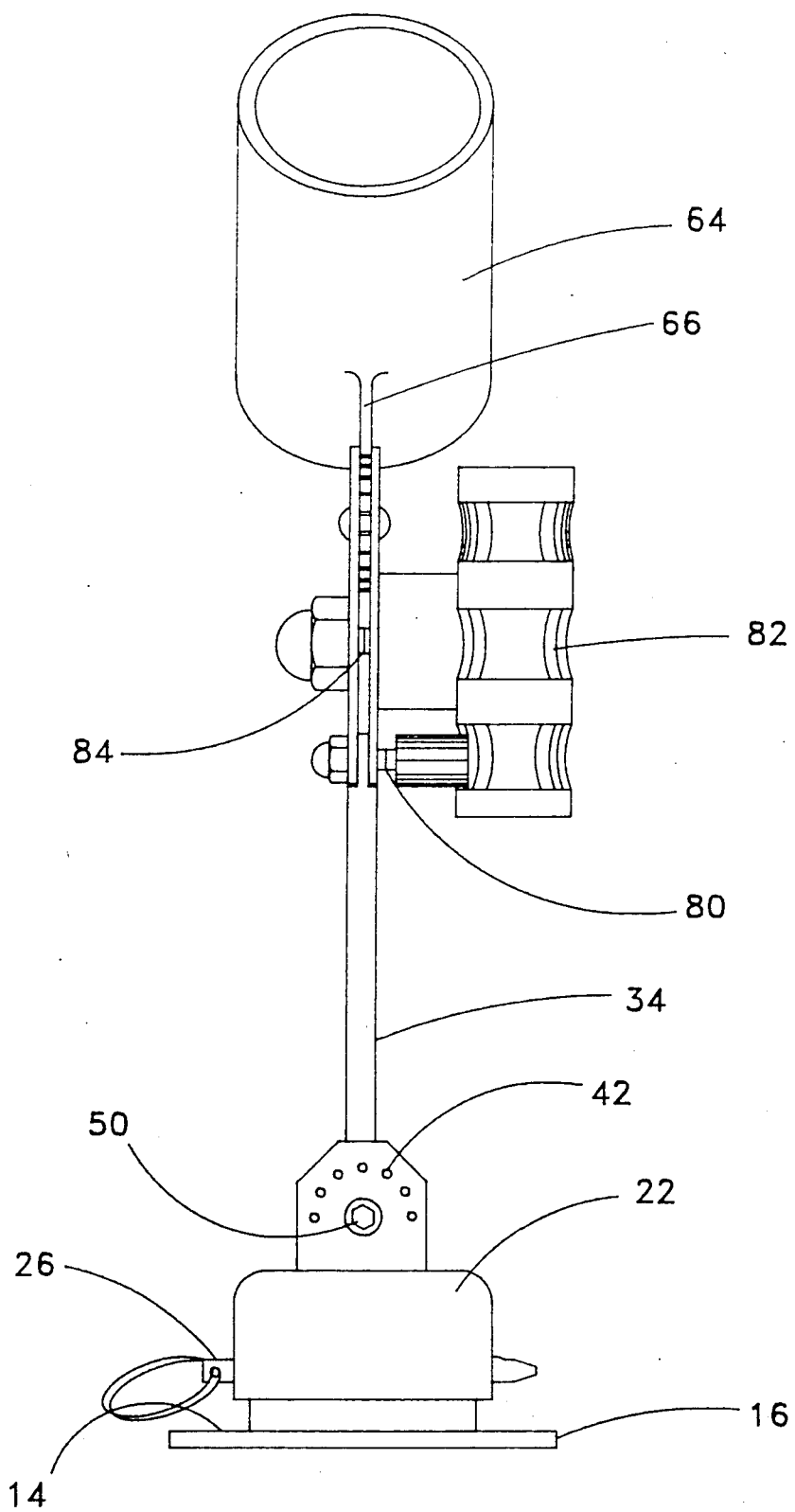
FIG. 3 is a front elevational view of a preferred embodiment.

The universal support apparatus 10 for a fishing rod 12 is illustrated in FIGS. 1, 2, and 3 as including a support base 14. One end of the support base 14 is formed into a pedestal 16 adapted to be mounted to any solid surface, and the other end is formed into a post 18 having a plurality of holes 20.

A cup-shaped receptacle 22 with a plurality of holes 24 is formed so as to be rotatably received on base post 18 with its holes 24 registrable with the holes 20 in post 18. A removable pin 26 may be inserted through registered holes 20 and 24 so as to secure the cup-shaped receptacle 22 to the support base 14.

Connected to the upper surface of the cup-shaped receptacle 22 is a generally U-shaped member 28 including a pair of upstanding legs 30 and 32. By removing pin 26 and rotating the cup-shaped receptacle 22 about the base post 18, the two standing portions 30 and 32 of the U-shaped member 28 may be rotated. The pin 26 may then be reinserted through other registered holes 20 and 24 to lock the cup-shaped receptacle 22 into any rotational position relative to the base 14.

An elongated generally rectangular support member 34 has an outer or upper end formed into a generally U-shaped ratchet and pawl housing 36, and an inner or lower end 38 adapted for pivotal connection to U-shaped member 28 of the cup-shaped receptacle 22. The lower end 38 of the support member 34 has formed on each side a pin 40 for interlocking with a set of opposing depressions 42 formed in the adjacent leg 30 or 32 of the U-shaped member 28. The lower end 38 of the support member 34 has a hole 44 registerable with holes 46 and 48 through legs 30 and 32 for receiving a centering pin 50 to secure the support member 34 to the U-shaped member 28.

The centering pin 50 has a head 52 at one end and an opposite threaded end. A threaded locking knob 54 is associated with the threaded end of the centering pin 50.

By rotating the locking knob 54 in one direction the pins 40 of the support member 34 may be locked into a set of opposing depressions 42 in the legs of U-shaped member 28. Since the opposing depressions 42 are formed in an arc, the support member may be adjusted to a position ranging from 0° to 180° relative to the support base 14.

The ratchet housing 36 on the upper end of support member 34 has bored through its opposing sides a pawl engagement hole 58, a ratchet coupling hole 60, and a locking pin hole 62.

Figure 4:
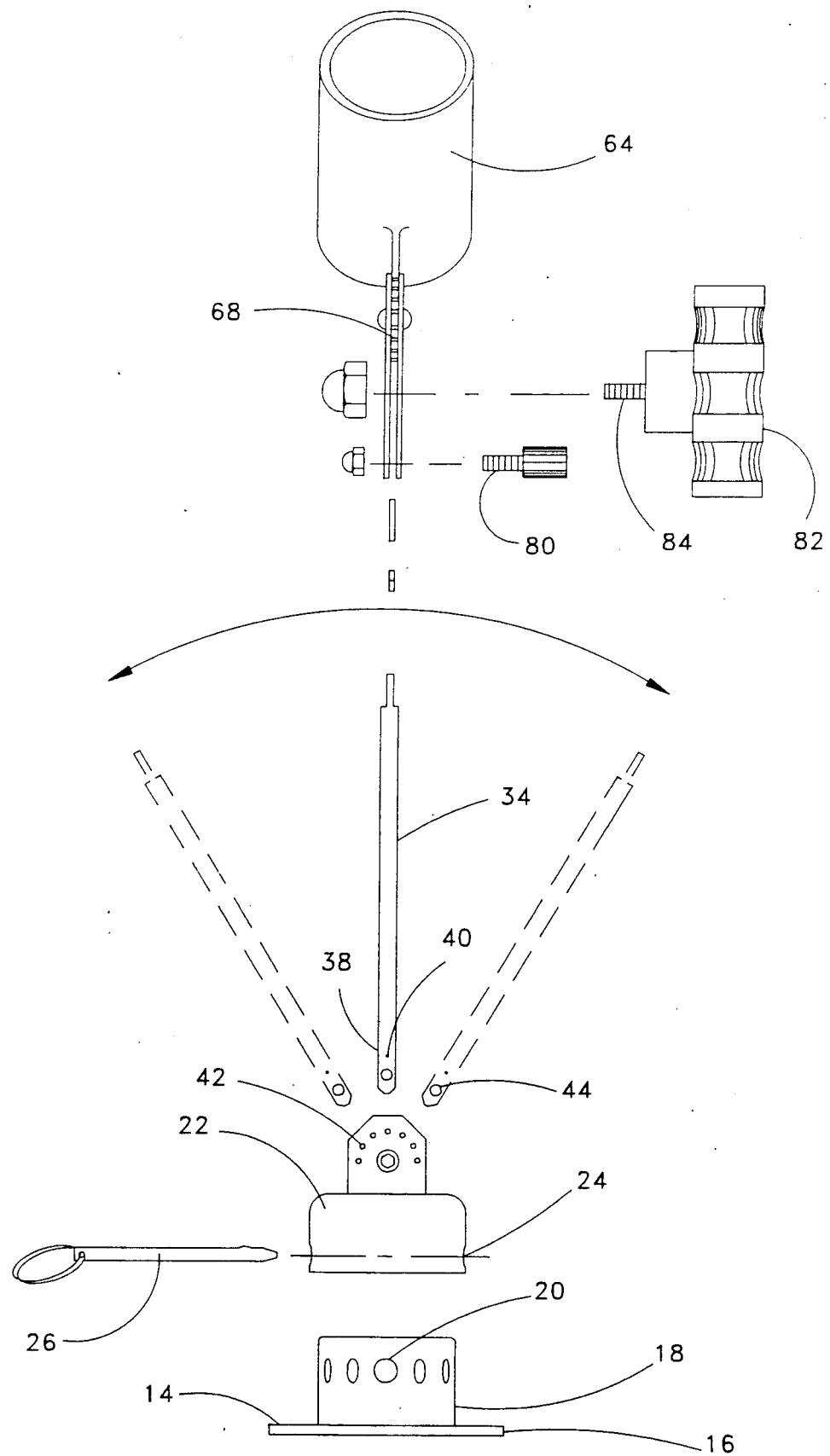
FIG. 4 is an exploded perspective view of a preferred embodiment.
Figure 5:
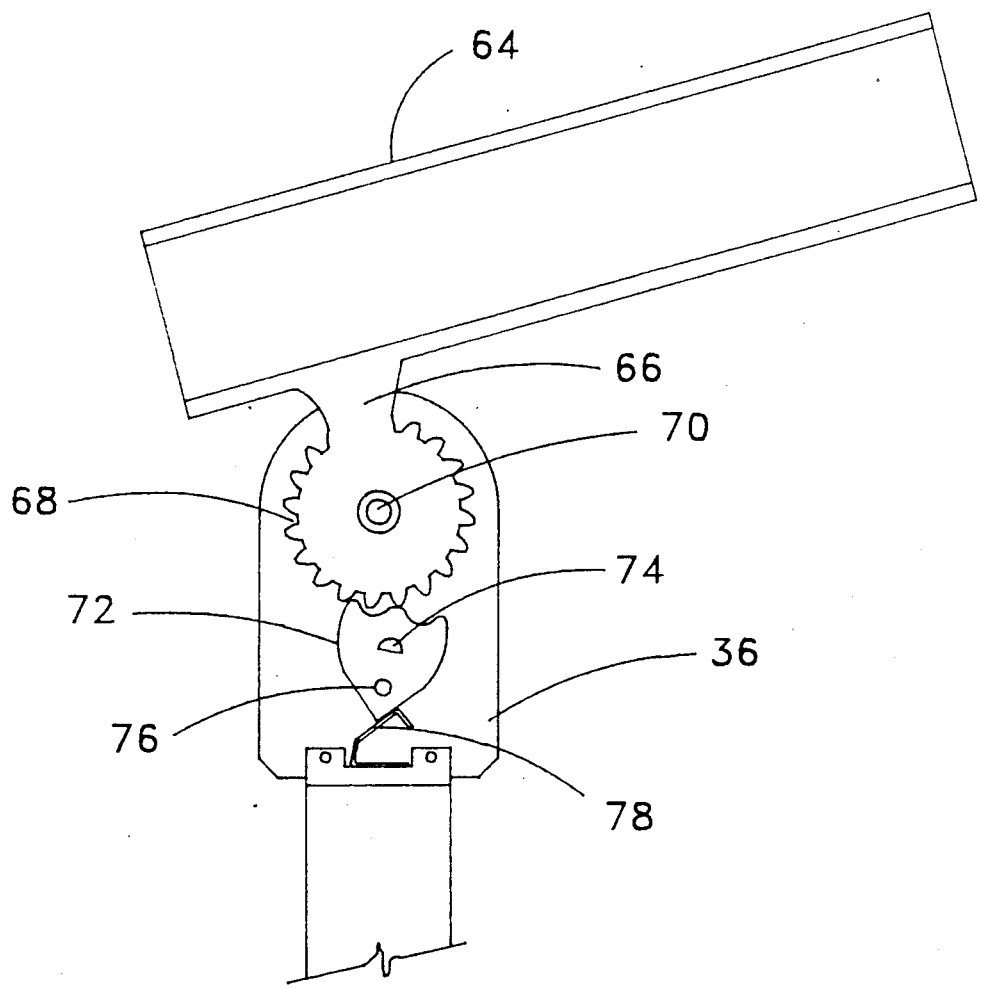
FIG. 5 is a partial elevational view with portions removed to show the coacting ratchet and pawl mechanism of a preferred embodiment.

FIGS. 4 and 5 illustrate the ratchet and pawl mechanism protected by the housing 36. A fishing rod receptacle 64 adapted for removably receiving a fishing rod handle has a flange 66 formed into a ratchet 68. The ratchet 68 has a hole 70 formed therethrough, and may be set between the two opposing sides of the ratchet housing 36. A fastener such as a bolt or rivet may be inserted through the holes 70 and 60 so as to form a bearing whereby the fishing rod receptacle 64 may be rotated within the ratchet housing 36.

A pawl 72 having a D-shaped hole 74 and a locking pin hole 76 coacts with a spring 78 located in the housing 36 so as to allow springed engagement with the pawl 72. The pawl may be locked from movement in one or the other direction by a springed pin 80.

A ratchet reversing knob 82 is attached to a pin 84 with a flat formed thereon for insertion into D-shaped hole 74 to reciprocate the pawl 72 so as to switch the direction the fishing rod receptacle 64 may be ratcheted.

Figures 6, 7:
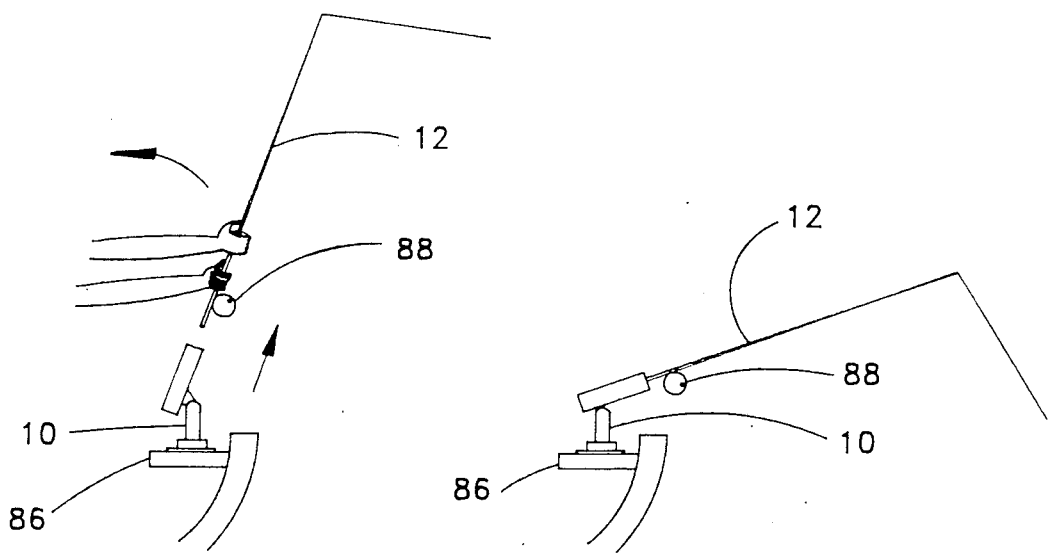
FIG. 6 is a side plan view of the universal support apparatus with a fishing rod supported therein.
FIG. 7 is a side plan view of a preferred embodiment showing how the ratchet and pawl mechanism assists in the removal of a fishing rod therefrom.

FIG. 6 portrays the apparatus 10 mounted to a horizontal surface 86, and a fishing rod and reel combination 88 held by the apparatus in a normal fishing configuration. FIG. 7 depicts how the ratchet and pawl mechanism of the apparatus facilitate setting a hook into a striking fish.

Figure 8:
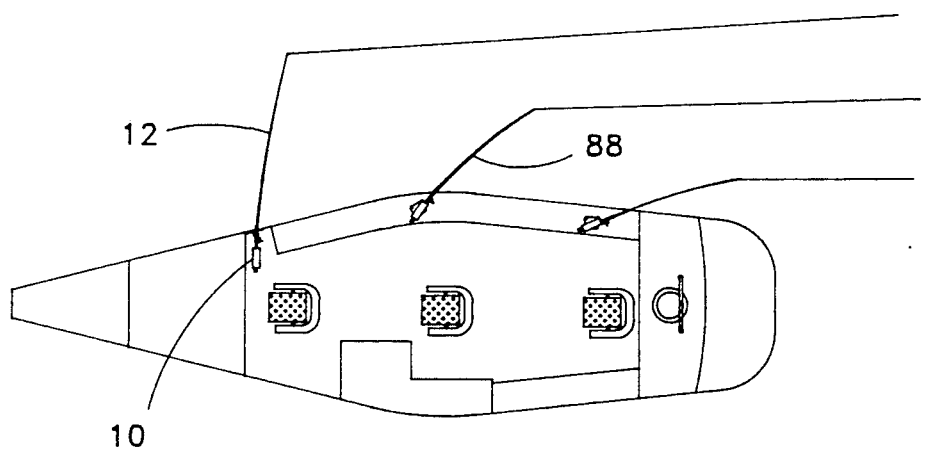
FIG. 8 is a top plan view showing three of the apparatus installed on a boat.

FIG. 8 illustrates how several of the apparatus 10 may be configured in order to prevent multiple fishing lines from tangling.

Figure 9:
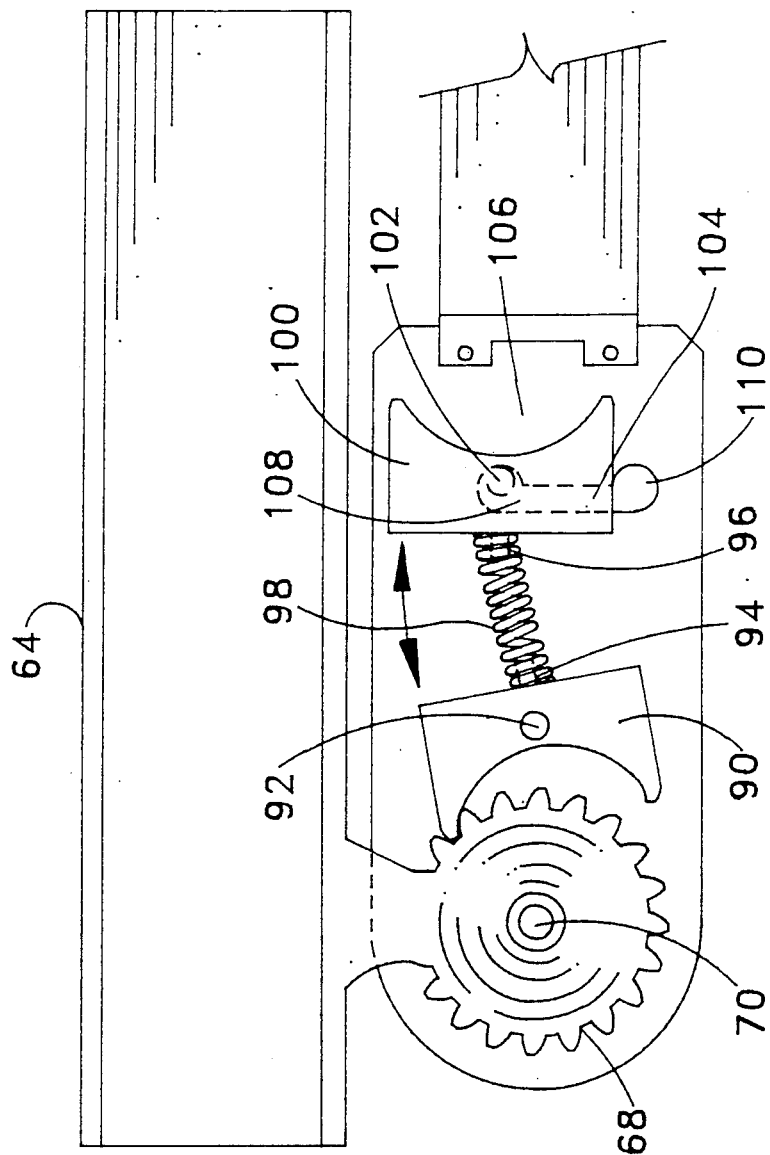
FIG. 9 is a cross-sectional view of the ratchet and pawl mechanism of a second embodiment.
Figure 10:
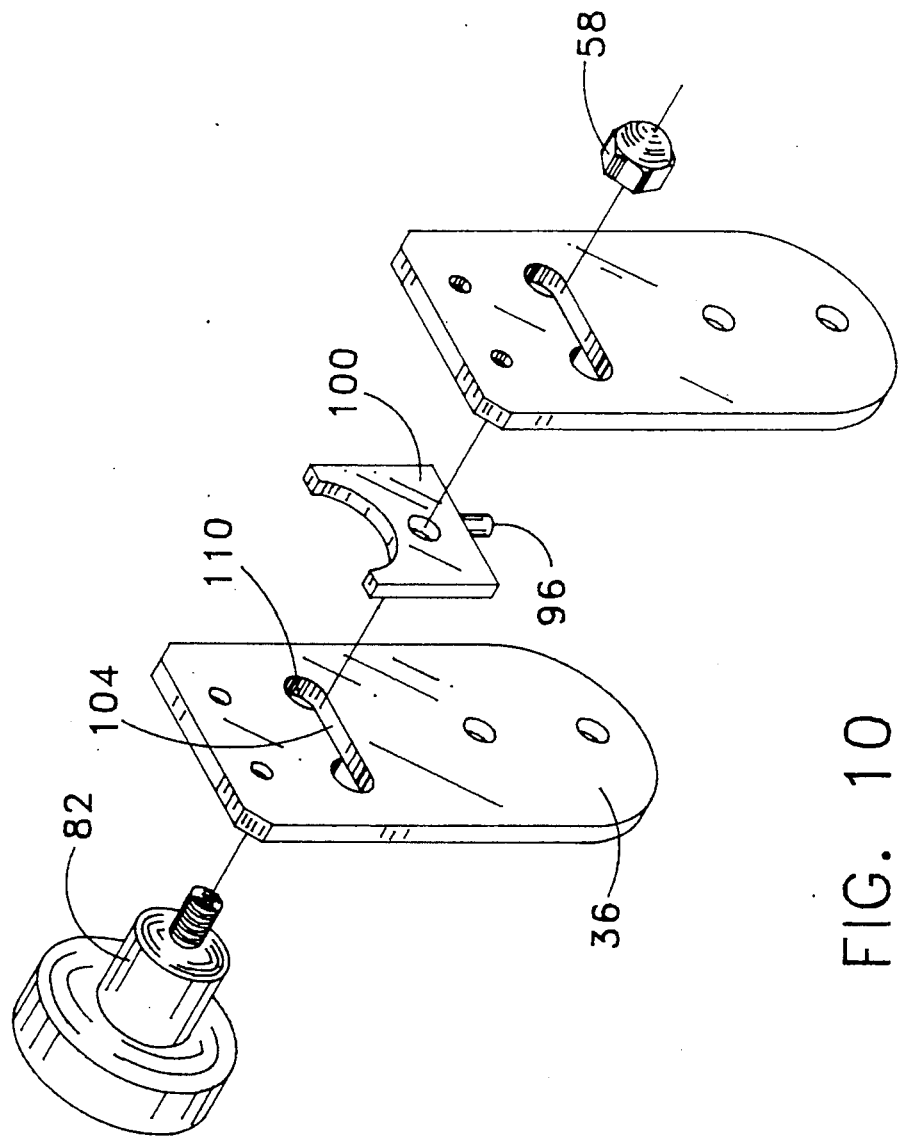
FIG. 10 is an exploded perspective view of the pawl assembly of the second embodiment.

FIGS. 9 and 10 illustrate another species of the apparatus wherein the ratchet and pawl mechanism is slightly modified for ease of manufacturing. FIG. 9 illustrates that the pawl 90 and pawl guide 100 are interchangeable.

The pawl 90 has a concave front face forming a pair of fingers for coacting with the ratchet 68. The pawl 90 is rotatable about a pin 92, and has a rear face having a protruding spring pin 94. A compression spring 98 may be passed over the pin 94 for maintaining the pawl 90 in an engaged position with the ratchet 68.

The pawl guide 100 is sandwiched within the ratchet housing. A guide slot 104 is formed through the housing plates 36. Each slot has a pair of ends having a generally D-shaped enlargement formed therethrough.

A pawl control knob 82 may be passed through housing 36, through the center hole 102 of the pawl guide 102, through opposing housing plate 36, and then retained by a threaded hexagonal nut 58.

Thus, by moving the knob 82 from slot position 108 to 110 the spring 98 tension can be changed so as to reverse the action of the pawl 92 and ratchet 68.

Whereas the specific material from which the apparatus is formed is not critical to the invention, the preferred embodiments have the apparatus formed of a noncorrosive and rugged material such as a high impact polymer, stainless steel, or aluminum. Likewise, the dimensions of the parts of the apparatus are not critical, as the device may be made so as to support both light and heavy tackle.

Whereas the invention has been shown and described in connection with preferred embodiments thereof, it is apparent that many additions, modifications and substitutions may be made which are within the intended broad scope of the appended claims. For example, the points of articulation may be formed as any joint known to a person familiar with the art of joints, and the fishing rod receptacle may be formed into any shape capable of securing a fishing rod.

Thus, there has been shown and described an improved fishing rod holder.

I claim:

1. In combination,
    a fishing rod having a handle, and
    a universal support apparatus for a fishing rod, comprising,
        a base having a pedestal adapted to be mounted on a surface,
        an open-ended generally hollow fishing rod handle receptacle adapted for removably receiving said fishing rod handle,
    support means for mounting said receptacle on said base,
    said support means being operative to provide freedom of pivotal movement of the receptacle about three perpendicular axes relative to said base,
    coacting ratchet and pawl means operatively associated with said receptacle and support means to block pivotal movement of said receptacle in one direction,
    said support means comprising,
        a post on said base,
        said post having an upper end,
        a cup-shaped receptacle adjustably rotatably supported on said upstanding post mounted on said pedestal for providing rotational motion about a first axis,
    said support means further comprising, for providing motion about a second axis perpendicular to said first axis, a generally U-shaped member connected to the upper surface of said cup-shaped member, a support member having one end adapted to be removably insertable into said generally U-shaped member, a center positioning pin pivotally connecting said one end to said U-shaped member, and coacting stop means on said support member and U-shaped member whereby said support member is adjustably moveable relative to said U-shaped member.

2. The apparatus of claim 1 wherein said coacting stop means includes spaced pins projecting from said one end of said support member, and said U-shaped member having a plurality of depressions registerable with said spaced pins.

3. The apparatus of claim 1 wherein said receptacle and support member are foldable to a height not exceeding the height of said U-shaped member mounted on said base.

* * * * *